United States Patent
Na et al.

(10) Patent No.: US 12,528,715 B2
(45) Date of Patent: Jan. 20, 2026

(54) APPARATUS AND METHOD FOR CONTROLLING CHEMICAL DOSING OPTIMIZATION FOR WATER TREATMENT PLANT

(71) Applicant: DOOSAN ENERBILITY CO., LTD., Changwon-si (KR)

(72) Inventors: Sang Gun Na, Seoul (KR); Hyun Sik Kim, Gimpo (KR); Jun Woo Yoo, Seoul (KR); Yeong Hyeok Kim, Seoul (KR); Jung Won Park, Gyeongju (KR); Young Geun Lee, Yongin (KR)

(73) Assignee: DOOSAN ENERBILITY CO., LTD., Changwon-si (KR)

( * ) Notice: Subject to any disclaimer, the term of this patent is extended or adjusted under 35 U.S.C. 154(b) by 435 days.

(21) Appl. No.: 18/149,775

(22) Filed: Jan. 4, 2023

(65) Prior Publication Data
US 2023/0212033 A1    Jul. 6, 2023

(30) Foreign Application Priority Data
Jan. 6, 2022   (KR) .......................... 10-2022-0002180

(51) Int. Cl.
*C02F 9/00* (2023.01)
*B01D 21/30* (2006.01)
(Continued)

(52) U.S. Cl.
CPC .............. *C02F 1/008* (2013.01); *B01D 21/30* (2013.01); *C02F 9/00* (2013.01); *G05D 21/00* (2013.01);
(Continued)

(58) Field of Classification Search
CPC .. C02F 1/008; C02F 9/00; C02F 1/001; C02F 1/24; C02F 1/441; C02F 1/444;
(Continued)

(56) References Cited

U.S. PATENT DOCUMENTS 6,068,012 A * 5/2000 Beardwood ............ G05D 21/02
137/88
6,408,227 B1 * 6/2002 Singhvi ................ G05B 13/027
700/32
(Continued)

FOREIGN PATENT DOCUMENTS

CN    106007202 A  * 10/2016
CN    111994970 A    5/2020
(Continued)

OTHER PUBLICATIONS

English translation of Patent Publication KR 102137201, published Jul. 24, 2020. (Year: 2020).*

(Continued)

*Primary Examiner* — Joseph W Drodge
(74) *Attorney, Agent, or Firm* — Harvest IP Law, LLP

(57) ABSTRACT

An apparatus for controlling chemical dosing optimization in a water treatment plant treating feed water includes: a control value derivation part configured to receive real-time data, analyze the real-time data through a water treatment model and a controller in response to receiving the real-time data, and calculate a control value, such that the control value is to set a minimum of a chemical dosage while maintaining a state of treated water of the water treatment plant in a normal range, the water treatment model simulating the water treatment plant and the controller being an optimization algorithm; and a chemical dosing output control part configured to provide the control value to a water treatment control device.

17 Claims, 15 Drawing Sheets

(51) Int. Cl.
*C02F 1/00* (2023.01)
*C02F 1/24* (2023.01)
*C02F 1/66* (2023.01)
*C02F 1/68* (2023.01)
*G05D 21/00* (2006.01)
*C02F 1/44* (2023.01)
*C02F 1/52* (2023.01)

(52) U.S. Cl.
CPC ............... *C02F 1/001* (2013.01); *C02F 1/24* (2013.01); *C02F 1/441* (2013.01); *C02F 1/444* (2013.01); *C02F 1/5209* (2013.01); *C02F 1/5245* (2013.01); *C02F 1/66* (2013.01); *C02F 1/68* (2013.01); *C02F 2209/001* (2013.01); *C02F 2209/006* (2013.01)

(58) Field of Classification Search
CPC ........ C02F 1/5209; C02F 1/5245; C02F 1/66; C02F 1/68; C02F 2209/006; C02F 1/5236; C02F 1/685; C02F 2209/001; C02F 2209/003; C02F 2209/008; C02F 2209/02; C02F 2209/03; C02F 2209/40; C02F 2209/42; C02F 1/686; C02F 1/687; C02F 2209/005; C02F 1/52; C02F 1/56; C02F 2103/08; C02F 2209/05; C02F 2209/06; C02F 2209/11; C02F 3/006; B01D 35/28; B01D 61/12; B01D 61/22; B01D 29/60; B01D 21/30; B01D 21/305; G05D 21/00; G05D 21/02; B03D 1/028; B03D 1/1431; G06N 3/006; G06N 3/08

See application file for complete search history.

(56) References Cited

U.S. PATENT DOCUMENTS

| | | | | |
|---|---|---|---|---|
| 6,535,795 | B1* | 3/2003 | Schroeder | G05B 13/029 210/85 |
| 6,845,336 | B2* | 1/2005 | Kodukula | G01N 33/18 702/50 |
| 9,725,348 | B2* | 8/2017 | Wright | C02F 11/12 |
| 12,351,480 | B2* | 7/2025 | Na | C02F 9/00 |
| 2002/0077777 | A1* | 6/2002 | Wolfe | G05B 23/0221 702/182 |
| 2003/0236649 | A1* | 12/2003 | Kodukula | C02F 1/008 702/188 |
| 2008/0314807 | A1* | 12/2008 | Junghanns | B01D 61/025 210/85 |
| 2010/0204924 | A1* | 8/2010 | Wolfe | C02F 1/008 702/188 |
| 2010/0332149 | A1* | 12/2010 | Scholpp | C02F 1/008 702/188 |
| 2011/0257788 | A1* | 10/2011 | Wiemers | C02F 1/463 700/271 |
| 2013/0193038 | A1* | 8/2013 | Robertson | C02F 3/302 210/85 |
| 2013/0313191 | A1* | 11/2013 | Wolf | C02F 9/00 210/638 |
| 2014/0277746 | A1* | 9/2014 | Konishi | C02F 1/008 700/265 |
| 2015/0259230 | A1* | 9/2015 | Li | C02F 1/688 210/85 |
| 2017/0297929 | A1* | 10/2017 | Whitaker | C02F 1/008 |
| 2018/0017948 | A1 | 1/2018 | Dash | |
| 2018/0370827 | A1 | 12/2018 | Kumar | |
| 2021/0039976 | A1* | 2/2021 | Kiljunen | C02F 11/12 |

FOREIGN PATENT DOCUMENTS

| | | | |
|---|---|---|---|
| JP | 4341164 B2 | 10/2009 | |
| JP | 5022610 B2 | 9/2012 | |
| JP | 2012-213759 A | 11/2012 | |
| JP | 2017140595 A | 8/2017 | |
| JP | 2019098331 A | 6/2019 | |
| JP | 2021035669 A | 3/2021 | |
| JP | 2021149472 A | 9/2021 | |
| JP | 2021159870 A | 10/2021 | |
| KR | 10-1085504 B1 | 11/2011 | |
| KR | 101253481 B1 | 4/2013 | |
| KR | 20160027815 A | 3/2016 | |
| KR | 10-1889510 B1 | 8/2018 | |
| KR | 102137201 B1 * | 7/2020 | ............ G06N 3/08 |
| KR | 10-2196828 B1 | 12/2020 | |
| KR | 102261819 B1 | 6/2021 | |
| KR | 1020210089211 A | 7/2021 | |
| WO | 2020/021688 A1 | 8/2020 | |
| WO | 2021214755 A1 | 10/2021 | |

OTHER PUBLICATIONS

English translation of Publication CN_106007202_A_1, published Oct. 12, 2016. (Year: 2016).*
KR OA, dated May 29, 2024.
EP EESR, dated May 24, 2023.
The KR Decision to grant, dated Apr. 7, 2025.

* cited by examiner

FIG. 5A

| Group 3 | Group 2 |
|---------|---------|
| Group 3 | Group 4 |

FIG. 5B

| | |
|---|---|
| Part 1 | Group 2 |
| Part 2 | |
| Part 3 | |
| Part 4 | |
| Part 5 | |
| Group 3 | Group 4 |

FIG. 5C

| Unit 1 | Unit 2 | Unit 3 | Unit 4 | Unit 5 | |
|---|---|---|---|---|---|
| Part 2 | | | | | Group 2 |
| Part 3 | | | | | |
| Part 4 | | | | | |
| Part 5 | | | | | |
| Group 3 | | | | | Group 4 |

APPARATUS AND METHOD FOR CONTROLLING CHEMICAL DOSING OPTIMIZATION FOR WATER TREATMENT PLANT

CROSS REFERENCE TO RELATED APPLICATION

The present application claims priority to Korean Patent Application No. 10-2022-0002180, filed Jan. 6, 2022, the entire contents of which are incorporated herein for all purposes by this reference.

BACKGROUND OF THE INVENTION

1. Field of the Invention

The present disclosure relates to a control technology. More particularly, the present disclosure relates to an apparatus and a method for controlling chemical dosing optimization for a water treatment plant.

2. Description of the Background Art

Pre-treatment performed by a seawater desalination plant uses chemicals, such as a pH control agent and a coagulant, at a stage before a dissolved air flotation (DAF) process in order to remove suspended materials such as solids. Existing methods rely on sampling experiments and operators' knowledge in order to dose appropriate chemicals, but it is difficult to perform control by applying real-time state changes in feed water, such as seawater, wastewater, etc.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing an apparatus and a method for controlling chemical dosing optimization for a water treatment plant.

According to an exemplary embodiment of the present disclosure, there is provided an apparatus for controlling chemical dosing optimization in a water treatment plant treating feed water, the apparatus including: a control value derivation part configured to receive real-time data, analyze the real-time data through a water treatment model and a controller in response to receiving the real-time data, and calculate a control value, such that the control value is to set a minimum of a chemical dosage while maintaining a state of treated water of the water treatment plant in a normal range, the water treatment model simulating the water treatment plant and the controller being an optimization algorithm; and a chemical dosing output control part configured to provide the control value to a water treatment control device.

The water treatment model may be configured to analyze the real-time data to calculate a prediction value for predicting the state of the treated water according to a state of the feed water for the water treatment plant, the treated water being discharged after the water treatment plant performs water treatment of the feed water, and the controller may be configured to refer to the prediction value to calculate the control value, such that the control value is to set the minimum of the chemical dosage while maintaining the state of the treated water of the water treatment plant in the normal range.

The control value derivation part may be configured to calculate the control value for each preset control period.

The control value derivation part may include: a group control value derivation part configured to classify a plurality of control targets into a plurality of groups, and analyze group data of the real-time data through the water treatment model for each group and the controller for each group, thereby, to calculate the control value for each group; a part control value derivation part configured to divide each of the plurality of groups into a plurality of parts, and analyze part data of the real-time data with the control value for each group as an initial value through the water treatment model for each part and the controller for each part, thereby, to calculate the control value for each part; and a unit control value derivation part configured to divide each of the plurality of parts into a plurality of units, and analyze unit data of the real-time data with the control value for each part as an initial value through the water treatment model for each unit and the controller for each unit, thereby, to calculate the control value for each unit.

The unit control value derivation part may be configured to, in response to ending of a control period before the control values for all of the units are calculated, use the control value for each group or the control value for each part calculated by a time point of the ending of the control period as the control value for each unit, and provide the control value for each unit substituting as a final control value to the chemical dosing output control part.

The group data may be data derived from the real-time data related to the control targets belonging to each group, the part data may be data derived from the real-time data related to the control targets belonging to each part, and the unit data may be data derived from the real-time data related to the control target belonging to each unit.

The apparatus may further include a controller selection management part that is configured to prepare a plurality of the controllers, evaluate respective performances of the plurality of the controllers through simulation for the plurality of the controllers, and select any one of the plurality of the controllers according to the evaluation.

The apparatus may further include a model generation and management unit that is configured to generate a plurality of the water treatment models, select the water treatment model having the highest similarity to the water treatment device among the plurality of the water treatment models, and provide the selected water treatment model to the control value derivation part, each of the plurality of the water treatment models simulating the water treatment plant and predicting the state of the treated water discharged after the water treatment plant performs water treatment of feed water for the water treatment plant, according to a state of the feed water.

According to an exemplary embodiment of the present disclosure, there is provided an apparatus for controlling chemical dosing optimization in a water treatment plant treating feed water, the apparatus including: a controller selection management part configured to evaluate respective performances of a plurality of controllers through simulation for the plurality of controllers, and select the controller according to the evaluated performances; and a control value derivation part configured to receive real-time data, analyze the real-time data through a water treatment model and the controller in response to receiving the real-time data, and calculate a control value, such that the control value is to set a minimum of a chemical dosage while maintaining a state of treated water of the water treatment plant in a normal range, the water treatment plant simulating the water treatment model and the controller being an optimization algorithm.

The water treatment model may be configured to analyze the real-time data to calculate a prediction value for predicting the state of the treated water according to a state of the feed water for the water treatment plant, the treated water being discharged after the water treatment plant performs water treatment of the feed water. Herein, the controller may be configured to refer to the prediction value to calculate the control value, such that the control value is to set the minimum of the chemical dosage while maintaining the state of the treated water of the water treatment plant in the normal range.

The control value derivation part may include: a group control value derivation part configured to classify a plurality of control targets into a plurality of groups, and analyze group data of the real-time data through the water treatment model for each group and the controller for each group, thereby, to calculate the control value for each group; a part control value derivation part configured to divide each of the plurality of groups into a plurality of parts, and analyze part data of the real-time data with the control value for each group as an initial value through the water treatment model for each part and the controller for each part, thereby, to calculate the control value for each part; and a unit control value derivation part configured to divide each of the plurality of parts into a plurality of units, and analyze unit data of the real-time data with the control value for each part as an initial value through the water treatment model for each unit and the controller for each unit, thereby, to calculate the control value for each unit.

The unit control value derivation part may be configured to, in response to ending of a control period before the control values for all of the units are calculated, use the control value for each group or the control value for each part calculated by a time point of the ending of the control period as the control value for each unit, and provide the control value for each unit substituting as a final control value to a chemical dosing output control part.

The group data may be data derived from the real-time data related to the control targets belonging to each group, the part data may be data derived from the real-time data related to the control targets belonging to each part, and the unit data may be data derived from the real-time data related to the control target belonging to each unit.

The apparatus may further include a model generation and management unit that is configured to generate a plurality of the water treatment models, select the water treatment model having the highest similarity to the water treatment device among the plurality of the water treatment models, and provide the selected water treatment model to the control value derivation part, each of the plurality of the water treatment models simulating the water treatment plant and predicting the state of the treated water discharged after the water treatment plant performs water treatment of feed water for the water treatment plant, according to a state of the feed water.

According to an exemplary embodiment of the present disclosure, there is provided a method for controlling chemical dosing optimization in a water treatment plant treating feed water, the method including: receiving real-time data by a control value derivation part; analyzing, by the control value derivation part, the real-time data through a water treatment model and a controller, and calculating a control value, such that the control value is to set a minimum of a chemical dosage while maintaining a state of treated water of the water treatment plant in a normal range, the water treatment model simulating the water treatment plant and the controller being an optimization algorithm; and providing the control value to a water treatment control device by a chemical dosing output control part.

In the calculating of the control value, the water treatment model may analyze the real-time data and may calculate a prediction value for predicting the state of the treated water according to a state of the feed water for the water treatment plant, the treated water being discharged after the water treatment plant performs water treatment of the feed water, and the controller may calculate the control value for dosing the minimum of the chemical dosage while the state of the treated water of the water treatment plant is maintained in the normal range.

In the calculating of the control value, the control value derivation part may calculate the control value for each preset control period.

The calculating of the control value includes: classifying, by a group control value derivation part, a plurality of control targets into a plurality of groups, and analyzing group data of the real-time data through the water treatment model for each group and the controller for each group, thereby, to calculate the control value for each group; dividing, by a part control value derivation part, each of the plurality of groups into a plurality of parts, and analyzing part data of the real-time data with control value for each group as an initial value through the water treatment model for each part and the controller for each part, thereby, to calculate the control value for each part; and dividing, by a unit control value derivation part, each of the plurality of parts into a plurality of units, and analyzing unit data of the real-time data with the control value for each part as an initial value through the water treatment model for each unit and the controller for each unit, thereby, to calculate the control value for each unit.

In the calculating of the control value, in response to ending of a control period before the control values for all of the units are calculated, the control value for each group or the control value for each part calculated by a time point of the ending of the control period may be used as the control value for each unit, and the control value for each unit substituting may be provided as a final control value to the chemical dosing output control part.

The group data may be data derived from the real-time data related to the control targets belonging to each group, the part data may be data derived from the real-time data related to the control targets belonging to each part, and the unit data may be data derived from the real-time data related to the control target belonging to each unit.

The method may further include: before the receiving of the real-time data, preparing a plurality of the controllers by a controller selection management part; evaluating respective performances of the plurality of the controllers through simulation for the plurality of the controllers by the controller selection management part; and selecting any one of the plurality of the controllers by the controller selection management part according to the evaluation.

The method may further include: before the receiving of the real-time data, generating, by a model generation and management unit, a plurality of the water treatment models, each of the plurality of the water treatment models simulating the water treatment plant and predicting the state of the treated water discharged after the water treatment plant performs water treatment of feed water for the water treatment plant, according to a state of the feed water; selecting, by the model generation and management unit, the water treatment model having the highest similarity to the water treatment device among the plurality of the water treatment models; and providing, by the model generation and management unit, the selected water treatment model to the control value derivation part.

According to the present disclosure, control targets are divided into groups, parts, and units, and operation is performed on a per-group basis, a per-part basis, and a per-unit basis, thereby improving the operation speed for calculating control values. Accordingly, the control values for chemical dosing optimization can be stably provided.

BRIEF DESCRIPTION OF THE DRAWINGS

FIGS. 5A to 5C are diagrams illustrating a control value for each group, part, and unit according to an embodiment of the present disclosure.

DETAILED DESCRIPTION OF THE INVENTION

Figure 1:
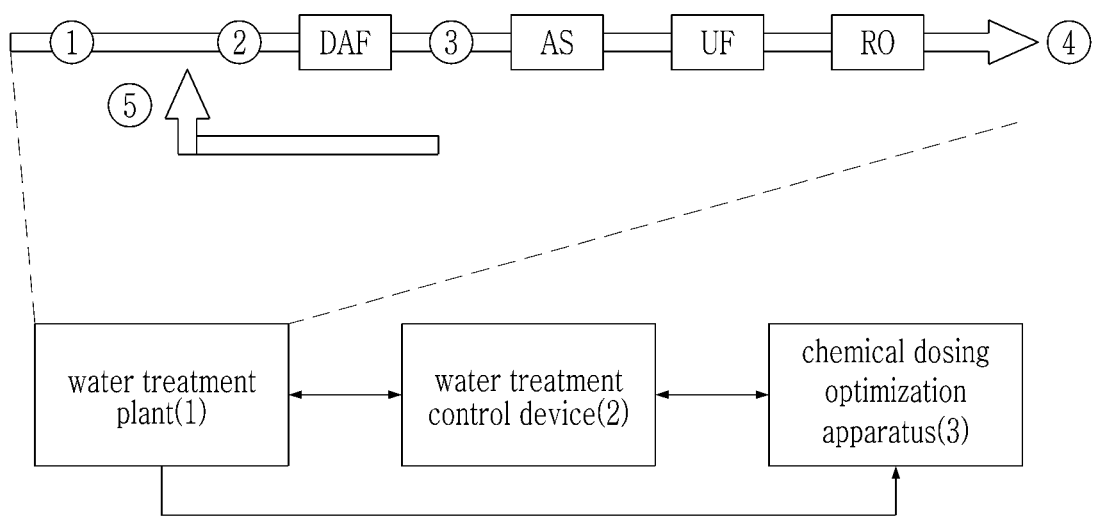
FIG. 1 is a diagram illustrating a configuration of a water treatment system according to an embodiment of the present disclosure.

The present disclosure may be modified in various ways and has various embodiments, so particular embodiments will be illustrated and described in detail. However, the present disclosure is not limited thereto, and the exemplary embodiments can be construed as including all modifications, equivalents, or substitutes in a technical concept and a technical scope of the present disclosure.

Also, "a module," "a unit," or "a part" in the disclosure performs at least one function or operation, and these elements may be implemented as hardware, such as a processor or integrated circuit, software that is executed by a processor, or a combination thereof. Further, a plurality of "modules," a plurality of "units," or a plurality of "parts" may be integrated into at least one module or chip and may be implemented as at least one processor except for "modules," "units" or "parts" that should be implemented in a specific hardware.

The terms used in the present disclosure are merely used to describe the particular embodiments, and are not intended to limit the present disclosure. As used herein, the singular forms "a", "an", and "the" are intended to include the plural forms as well, unless the context clearly indicates otherwise. In the present disclosure, it is to be understood that terms such as "including", "having", "comprising" etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, exemplary embodiments of the present disclosure will be described in detail with reference to the drawings. Herein, it is noted that the same elements in the drawings are denoted by the same reference numerals. In addition, well-known functions and constructions that may obscure the gist of the present disclosure will not be described. For the same reason, some elements are exaggerated or omitted, or schematically shown in the drawings.

First, a water treatment system according to an embodiment of the present disclosure will be described. FIG. 1 is a diagram illustrating a configuration of a water treatment system according to an embodiment of the present disclosure. Referring to FIG. 1, the water treatment system according to an embodiment of the present disclosure includes a water treatment plant 1, a water treatment control device 2, and a chemical dosing optimization apparatus 3.

The water treatment plant 1 is for water treatment of treating feed water ① flowing into the water treatment plant 1 to suit an objective, and of discharging treated water ④. Examples of the water treatment include water treatment for a particular use, wastewater treatment, seawater desalination treatment, etc. The water treatment plant 1, according to an embodiment, includes a dissolved air flotation (DAF) device, an automatic strainer (AS), an ultrafiltration (UF) device, and a reverse osmosis (RO) device.

The DAF device treats the feed water ② according to dissolved air flotation. The automatic strainer (AS) removes solids remaining in the feed water ③ treated by the DAF device so as to prevent foreign substances from flowing in. The UF device includes a plurality of ultrafiltration units each having an ultrafiltration membrane. The UF device performs an ultrafiltration process in which the ultrafiltration membranes of the plurality of ultrafiltration units are used to filter out impurities remaining in the feed water ③. The UF device may pass treated water through the ultrafiltration membranes of the plurality of ultrafiltration units so as to filter out impurities remaining in the treated water. The RO device includes a plurality of trains each having a reverse osmosis membrane. The RO device performs a reverse osmosis process in which the reverse osmosis membranes of the plurality of trains are used to filter out impurities remaining in the feed water ③. The RO device passes the treated water through the reverse osmosis membranes of the feed water ③ according to a reverse osmosis principle, and discharges the treated water ④.

The water treatment control device 2 is basically a device for controlling the water treatment plant 1. In particular, chemicals are fed ⑤ in an early-stage process of the water treatment plant 1, and the water treatment control device 2 may control the chemical dosage. More specifically, in the early-stage process of the water treatment plant 1, chemicals, for example, an ion concentration (pH) control agent (e.g., H2SO4) and a coagulant (e.g., FeCl3) are fed. The water treatment control device 2 may control the dosing and the dosage of the chemicals.

The chemical dosing optimization apparatus 3 is for chemical dosing optimization. As described above, the water treatment control device 2 controls chemical dosing and the dosage for the water treatment plant 1. Herein, chemical dosing optimization is required so that the state of the treated water by water treatment is maintained in a normal range and a minimum of the chemical dosage is used in the feed water, as necessary. However, the chemical dosage affects the differential pressure (DP) of the automatic strainer (AS), the UF device, and the RO device performing a late-stage process, so chemical dosing optimization is performed considering the differential pressure. The chemical dosing optimization apparatus 3 is for performing such chemical dosing optimization by controlling the water treatment control device 2 or giving guidance thereto. The chemical dosing optimization apparatus 3 may perform the chemical dosing optimization by providing guidance information to the water treatment control device 2.

Figure 2:
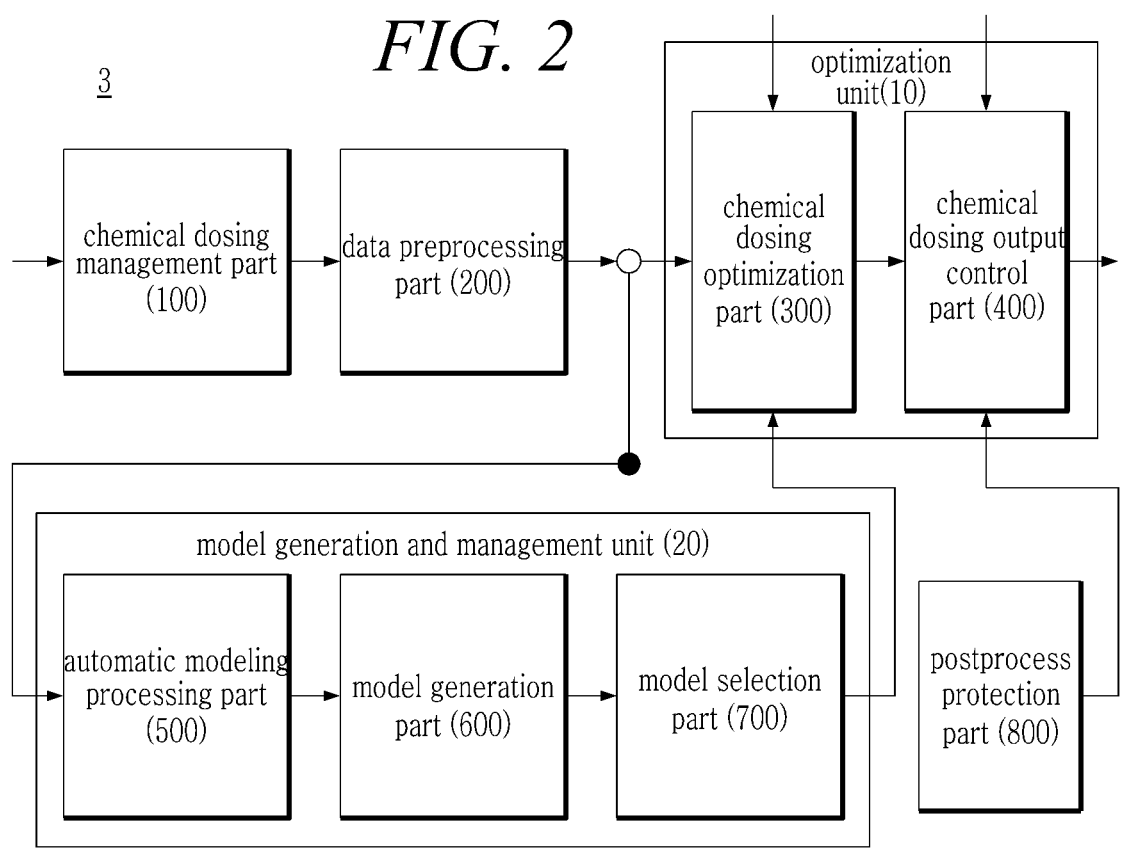
FIG. 2 is a block diagram illustrating a configuration of a chemical dosing optimization apparatus according to an embodiment of the present disclosure.

Next, a configuration of the chemical dosing optimization apparatus 3 according to an embodiment of the present disclosure will be described. FIG. 2 is a block diagram illustrating the configuration of the chemical dosing optimization apparatus according to an embodiment of the present disclosure. Referring to FIG. 2, the chemical dosing optimization apparatus 3 according to the embodiment of the present disclosure may include a chemical dosing management part 100 (performing DAF chemical dosing management), a data preprocessing part 200 (performing data preprocessing), an optimization unit 10 (performing chemical dosing optimization), a model generation and management unit 20 (performing DAF model generation and management), and a postprocess protection part 800 (postprocess protection logic). Furthermore, the optimization unit 10 may include a chemical dosing optimization part 300 (performing chemical dosing optimization algorithm) and a chemical dosing output control part 400 (which may be alternatively referred to as chemical dosing output controller). Furthermore, the model generation and management unit 20 may include an automatic modeling processing part 500 (which may be alternatively referred to as auto modeling processor for DAF model), a model generation part 600 (which may be alternatively referred to as DAF model candidate generator), and a model selection part 700 (which may be alternatively referred to as DAF model selection & management processor).

The chemical dosing management part 100 is for managing a chemical dosing optimization process. The chemical dosing management part 100 receives real-time data including operating data and state data from the water treatment plant 1 or the water treatment control device 2 or both, and analyzes the real-time data to determine whether to perform the chemical dosing optimization process. The real-time data means the operating data and the state data measured or derived in real time. In an embodiment of the present disclosure, the operating data may refer to and may include any one of all types of data including values, specifically, a set value (SV or target value (set point (SP))), a measured value (process variable (PV) or current value (CV)), and a manipulation value (manipulate variable (MV) or moderator variable), wherein the values are input to control processes or measured for the processes performed by the DAF device, the automatic strainer (AS), the UF device, and the RO device. Herein, the set value (SV or SP) means a value for setting a control target of an object to be controlled. The measured value (PV or CV) means a sensed value obtained by measuring the object to be controlled. The manipulation value (MV) means a control value for manipulation so that the object to be controlled reaches the set value from the measured value. Examples of the set value and the measured value include flow rate, pressure, water level, temperature, etc. Examples of the manipulation value include an opening ratio, the RPM speed of a motor, voltage, current, etc. The operating data may be processed according to each objective and may be used for analysis. In an embodiment of the present disclosure, data derived or processed for analyzing the operating data is referred to as the state data. Examples of the state data include values obtained by processing, through a logic derived through operating knowledge, data resulting from measuring a differential pressure of input and output stages of the UF device and the RO device.

The data preprocessing part 200 receives raw data. Herein, the raw data includes the operating data and the state data received by the data preprocessing part 200 from the water treatment plant 1 or the water treatment control device 2 or both. The raw data results from accumulation and storage of the operating data and the state data collected from the water treatment plant 1 and the water treatment control device 2. Accordingly, the raw data may include the real-time data including the operating data and the state data collected in real time. When the raw data is collected, the data preprocessing part 200 may preprocess the raw data to generate training data that includes data for training and data for verification. The training data may be provided to the model generation and management unit 20. In addition, the data preprocessing part 200 may preprocess the real-time data and may provide the preprocessed real-time data to the optimization unit 10. The data preprocessing part 200 may use tags indicating data attributes to perform preprocessing by analyzing the raw data including the real-time data. This preprocessing is to perform at least one from among signal processing, normal data processing (based on knowledge/data), and outlier removal to remove noise, or to remove noise in data, or to remove data that may adversely affect generating a DAF model or designing a controller.

The optimization unit 10 analyzes the real-time data to derive a control value for optimizing the chemical dosage. The optimization unit 10 may include the chemical dosing optimization part 300 and the chemical dosing output control part 400 as described above.

The chemical dosing optimization part 300 may analyze current data, and use an analysis result of the current data to select an optimum controller, which is the most optimal controller, from among a plurality of controllers previously created, and search for an optimal chemical dosing control value. To search for the optimal chemical dosing control value, optimization design information may be used. Th optimization design information may include an objective function, a constraint, a moderator variable, a searching range, etc. Herein, using at least one water treatment model, the chemical dosing optimization part 300 may analyze the real-time data to derive a prediction value for predicting the state (for example, turbidity, pH, etc.) of the treated water of the water treatment plant 1. In addition, using at least one controller, the chemical dosing optimization part 300 may derive a control value based on the prediction value, such that the control value is to set minimum of a chemical dosage tob e dosed in the feed water, required for maintaining the state of the treated water of the water treatment plant 1 in the normal range. In other words, while the state of the treated water of the water treatment plant 1 is changed by an amount of chemical dosage used and the chemical dosage is changed by the control value, a control value may be derived by the chemical dosing optimization part 30 such that the control value is to set the lowest amount of the chemical dosage that makes the state of the treated water of the water plant 1 be in the normal range. The normal range of the treated water may be a predetermined value range of any indication of acidity (pH), turbidity, residual iron, dissolved oxygen, nitrogen, mercury, phosphorus, carbon dioxide, or hydrogen ion concentration of/in the treated water or any combination thereof.

The chemical dosing output control part 400 processes the control value into application control values that are values applicable to the water treatment control device 2, and provides the application control values, i.e., inputs, to the water treatment control device 2 such that the water treatment control device 2 operates stably.

The control value provided from the chemical dosing optimization part 300 to the chemical dosing output control part 400 is derived using the real-time data by the chemical dosing optimization part 300. However, there may be a case when the control value is data of the past the time, e.g., one minute or five minutes, ago than the present time point of processing by the chemical dosing output control part 400. In other words, there may be a case when it takes time for the chemical dosing optimization part 300 to search for the control value. Accordingly, according to an embodiment, the chemical dosing output control part 400 performs comparison with the current operating data and the current state data, and when variations are equal to or greater than reference values, the chemical dosing output control part 400 may correct the control value.

In addition, the chemical dosing output control part 400 may correct the control value by using a current target value (i.e., a set point) of the water treatment control device 2 and a correction bias value derived by the postprocess protection part 800 according to a postprocess protection logic. Alternatively, the chemical dosing output control part 400 may calculate a guide value for providing guidance.

According to an embodiment, the chemical dosing output control part 400 may convert the control value according to a range applicable to the water treatment control device 2 and provides the control value resulting from conversion to the water treatment control device 2. Specifically, according to an embodiment, the chemical dosing output control part 400 may convert the control value according to a control period and a control range of the water treatment control device 2 compared to a period of derivation of the control value by the chemical dosing optimization part 300. Then, the chemical dosing output control part 400 may provide the control value resulting from conversion. For example, assuming that the time period, that is, the period of derivation (or control period) of the control value, for the chemical dosing optimization part 300 to search for an optimal control value, is one minute and that the control period of the water treatment control device 2 is 10 seconds and that the control range is ±4, the control value of which the period of derivation (control period) is one minute is divided considering the control period, a 10-second interval, of the water treatment control device 2 and the control range of ±4, thereby converting the control value. Specifically, when the control value for increasing by 20 from an existing value is converted into values, 4(+4), 8(+4), 12(+4), 16(+4), 20(+4), and 20(+0)), increased by 4 every 10 seconds.

The model generation and management unit 20 is for automatically generating at least one water treatment model through training. The water treatment model is an algorithm including at least one artificial neural network, and simulates the water treatment plant 1 that generates treated water through water treatment (for example, DAF) of feed water. According to an embodiment, the water treatment model may receive various types of information indicative of the state of the feed water, and calculates a prediction value, such as acidity or a variation in acidity of the treated water, turbidity or a variation in turbidity, etc., for predicting the state of the treated water by performing an operation on the state of the feed water as trained. Herein, examples of the state of the feed water may include the flow rate of the feed water, temperature, conductivity, acidity (or hydrogen ion concentration), turbidity, the throughput for the feed water (per unit time), the injection dosing concentration for the feed water, etc. In addition, examples of the state of the treated water may include acidity or a variation in acidity of the treated water, turbidity or a variation in turbidity, residual iron, etc.

According to an embodiment, the model generation and management unit 20 may include the automatic modeling processing part 500, the model generation part 600, and the model selection part 700.

The automatic modeling processing part 500 may receive model design information, such as a type, a structure, input and output, a training factor of a model, etc., and derive the data for training and the data for verification automatically from water treatment data accumulated and stored.

The data for training and the data for verification may include input data and output data corresponding to input data. For example, examples of the input data may include the flow rate of the feed water, temperature, conductivity, acidity (or hydrogen ion concentration), turbidity, the throughput for the feed water (per unit time), the injection dosing concentration for the feed water, etc. In addition, the output data is a target value for a prediction value corresponding to the input data. Examples of the output data may include acidity or a variation in acidity of the treated water, turbidity or a variation in turbidity, etc.

The model generation part 600 may receive the model design information, the data for training, and the data for verification from the automatic modeling processing part 500, and generate at least one water treatment model. That is, the model generation part 600 may generate a plurality of water treatment models through training with the data for training and the data for verification, wherein the water treatment models simulate the water treatment plant and predict the states of the treated water according to the states of the feed water for the water treatment plant.

The model selection part 700 is for selecting an optimal water treatment model by comparing a water treatment model generated by the model generation part 600 with pre-stored water treatment models for evaluation. To this end, evaluation data indicative of the water treatment plant 1 at the time point of evaluation may be used to evaluate the plurality of water treatment models. Similarly to the data for training and the data for verification, the evaluation data may include input data and output data corresponding to the input data. That is, the model selection part 700 may generate the evaluation data based on data collected from the water treatment device 1 at the time point of evaluation, and perform evaluation with the generated evaluation data. That is, the model selection part 700 uses the evaluation data collected from the water treatment device at the time point of evaluation to evaluate the plurality of water treatment models. As an evaluation result, the model selection part 700 selects, among the plurality of water treatment models, the water treatment model having the highest similarity to the water treatment device 1 at the time point of evaluation. Next, the model selection part 700 provides the selected water treatment model to the chemical dosing optimization part 300. In addition, each time evaluation ends, the model selection part 700 may arrange the water treatment models in order of generation. When the storage capacity of a storage space in which the water treatment models are stored becomes insufficient, the model selection part 700 may delete, among the unselected water treatment models, the water treatment models sequentially in chronological order of generation. In other words, when the storage capacity of a storage space in which the water treatment models are stored becomes insufficient, the model selection part 700 may delete, among the unselected water treatment models, the oldest water treatment models in terms of their generation.

The postprocess protection part 800 may receive postprocess data including the operating data and the state data of the late-stage process, specifically, the process performed by the automatic strainer (AS), the UF device, and the RO device, of the water treatment plant 1. Then the postprocess protection part 800 may analyze the received postprocess data to derive the correction bias value for protecting the postprocess according to the postprocess protection logic for preventing damage to the late-stage process (for example, occurrence of fouling). Herein, fouling means a phenomenon in which contaminants in the feed water clog a membrane. The correction bias value is provided to the chemical dosing output control part 400.

Figure 3:
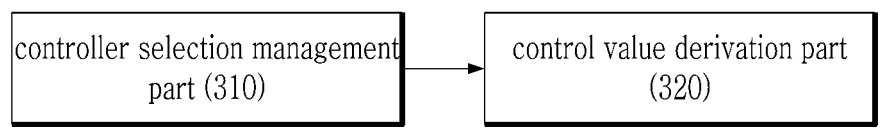
FIG. 3 is a diagram illustrating a detailed configuration of a chemical dosing optimization part according to an embodiment of the present disclosure.

Next, a configuration of the chemical dosing optimization part 300 according to an embodiment of the present disclosure will be described in more detail. FIG. 3 is a diagram illustrating the detailed configuration of the chemical dosing optimization part according to an embodiment of the present disclosure. Referring to FIG. 3, the chemical dosing optimization part 300 may include a controller selection management part 310 and a control value derivation part 320.

The controller selection management part 310 may use data to evaluate performances of a plurality of controllers through simulation, and selects a controller from among the plurality of controllers to be used for chemical dosing optimization according to an evaluation result. In this performance evaluation, according to an embodiment, the previously selected water treatment model may be used. Each controller is an optimization algorithm model, and examples of the controller may include at least one of particle swarm optimization (PSO), an autoregressive eXogeneous (ARX) model, the Ziegler-Nichols (ZN) method, etc. The controller selection management part 310 selects, among the plurality of controllers described above, a controller that derives a minimum of a chemical dosage while the state of the treated water of the water treatment plant 1 is maintained in the normal range. In other words, a controller is selected from among the plurality of controllers such that the controller derives the lowest amount of the chemical dosage maintaining the state of the treated water of the water treatment plant 1 in the normal range. The selected controller is provided to the chemical dosing optimization part 300.

The control value derivation part 320 may analyze the real-time data using the water treatment model and the controller and calculates a control value for chemical dosing optimization. Herein, the real-time data may include the operating data and the state data received from the water treatment plant 1 or the water treatment control device 2 or both. In particular, the real-time data includes the state of the feed water, the state of the treated water, and performance information of the water treatment plant 1. Herein, examples of the state of the feed water may include the flow rate of the feed water, temperature, conductivity, acidity (or hydrogen ion concentration), turbidity, the throughput for the feed water (per unit time), the injection dosing concentration for the feed water, etc. In addition, examples of the state of the treated water may include acidity or a variation in acidity of the treated water, turbidity or a variation in turbidity, etc. The control value derivation part 320 analyzes the real-time data using the water treatment model and the controller and calculates the control value for dosing a minimum of a chemical dosage while the state of the treated water of the water treatment plant 1 is maintained in the normal range. According to an embodiment, the control value may be calculated for each control period (for example, one minute) of the chemical dosing optimization apparatus 3. According to another embodiment, the control value may be sequentially calculated on a per-group basis, a per-part basis, and a per-unit basis.

Figure 4:
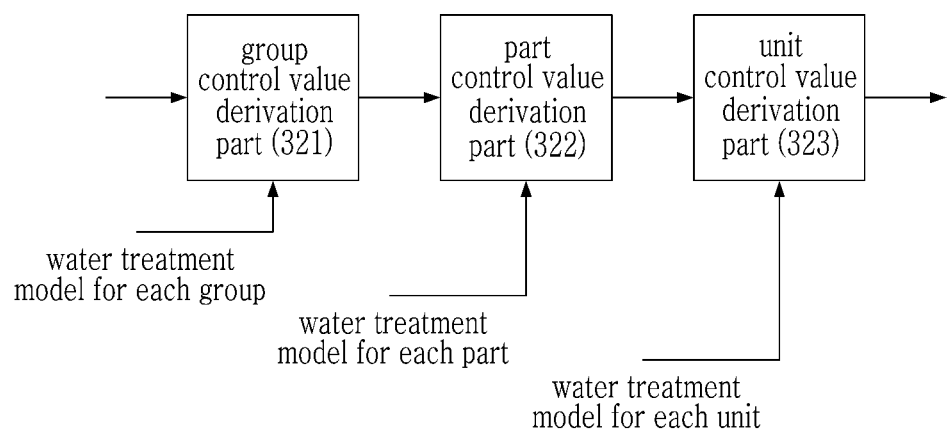
FIG. 4 is a diagram illustrating a detailed configuration of a control value derivation part according to an embodiment of the present disclosure.
Figure 5A:
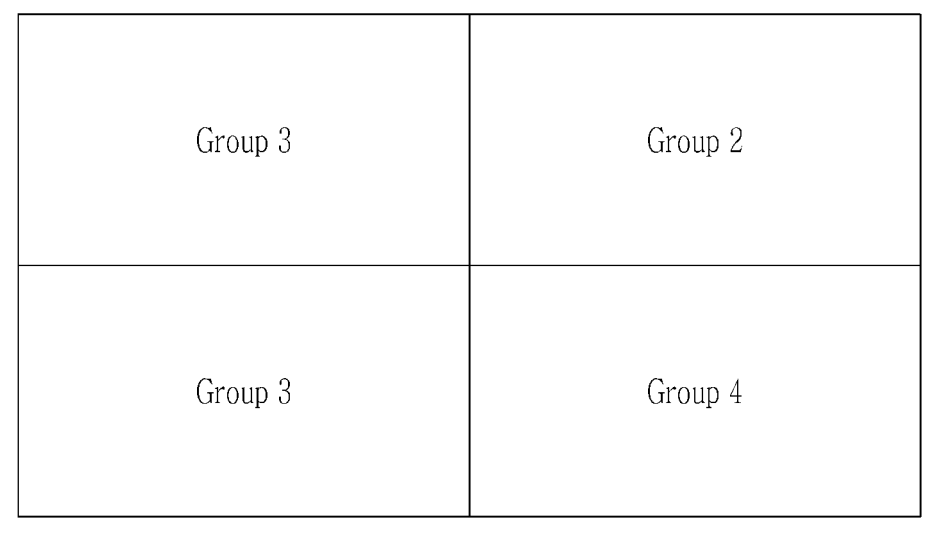

Next, a configuration of the control value derivation part 320 according to an embodiment of the present disclosure will be described in more detail. FIG. 4 is a diagram illustrating the detailed configuration of the control value derivation part 320 according to an embodiment of the present disclosure. FIGS. 5A to 5C are diagrams illustrating a control value for each group, part, and unit according to an embodiment of the present disclosure.

Referring to FIG. 4, the control value derivation part 320 according to an embodiment includes a group control value derivation part 321, a part control value derivation part 322, and a unit control value derivation part 323.

The control value derivation part 320 may receive, from the model selection part 700 of the model generation and management unit 20, a water treatment model for each group, a water treatment model for each part, and a water treatment model for each unit. The water treatment model for each group is a water treatment model trained with group data of the raw data, the water treatment model for each part is a water treatment model trained with part data of the raw data, and the water treatment model for each unit is a water treatment model trained with unit data of the raw data. The group data, the part data, and the unit data will be described in more detail below.

The group control value derivation part 321 classifies a plurality of control targets into a plurality of groups. The part control value derivation part 322 divides each of the plurality of groups into a plurality of parts. The unit control value derivation part 323 divides each of the plurality of parts into a plurality of units. For example, as shown in FIGS. 5A to 5C, control targets of the water treatment plant 1 are classified into groups as shown in FIG. 5A, and each group is divided into parts as shown in FIG. 5B, and each part is further divided into units as shown in FIG. 5C. Specifically, for example, it is assumed that the plurality of control targets are chemical dosages dosed into a plurality of water tanks of the dissolved air flotation (DAF) device. For example, when there are 100 water tanks, 25 water tanks may be classified as one group, 25 water tanks belonging to each group may be divided into five parts each including five water tanks, and five water tanks belonging to each part may be divided into five units each including one water tank.

The group control value derivation part 321 may classify the plurality of control targets into the plurality of groups. Then the group control value derivation part 321 may analyze the group data of the real-time data using the water treatment model for each group and a controller for each group and, thereby the group control value derivation part 321 may calculate a control value for each of the plurality of groups. The control value for each group is a control value for each of the plurality of groups resulting from such classification. For example, the control value for one group may be a chemical dosage to be dosed in common into 25 water tanks belonging to the particular one group.

The part control value derivation part 322 may divide each of the plurality of groups into the plurality of parts. Then, the part control value derivation part 322 may analyze the part data of the real-time data with the control value for each group as an initial value using the water treatment model for each part and a controller for each part, thereby the part cotnrol value derivation part 322 may calculate a control value for each of the plurality of parts. The control value for each part is a control value for each of the plurality of parts resulting from division. For example, the control value for one part may be a chemical dosage to be dosed in common into five water tanks belonging to the particular one part.

The unit control value derivation part 323 may divide each of the plurality of parts into the plurality of units. Then the unit control value derivation part 323 may analyze the unit data of the real-time data with the control value for each part as an initial value using the water treatment model for each unit and a controller for each unit to calculate a control value for each of the plurality of units. The control value for each unit is a control value for each of the plurality of units resulting from division. For example, the control value for one unit may be a chemical dosage to be dosed into one water tank belonging to the particular one unit.

The group data is data derived from the real-time data corresponding to the control targets belonging to each group. The part data is data derived from the real-time data corresponding to the control targets belonging to each part. The unit data is data derived from the real-time data corresponding to the control targets belonging to each unit. As a specific example, the real-time data may include the following: the state (for example, turbidity, and acidity) of the feed water flowing into each of the 100 water tanks; and the state (for example, turbidity, and acidity) of the treated water discharged from each of the 100 water tanks after being processed according to dissolved air flotation in each of the 100 water tanks. In this case, the group data of a group may include average values, median values, lowest values, highest values, etc. of the states (for example, turbidity, and acidity) of the feed water and the treated water of 25 water tanks belonging to the group. In addition, the part data of a part may include average values, median values, lowest values, highest values, etc. of the states (for example, turbidity, and acidity) of the feed water and the treated water of five water tanks belonging to the part. In turn, the unit data of a unit may include values of the states (for example, turbidity, and acidity) of the feed water and the treated water of a water tank belonging to the unit.

The group control value derivation part 321, the part control value derivation part 322, and the unit control value derivation part 323 may calculate the control value for each group, and use the control value for each group as an initial value to calculate the control value for each part, and use the control value for each part as an initial value to calculate the control value for each unit. Accordingly, it is possible to significantly reduce operation time, compared to calculating simultaneously the control value for each unit that is a sought final control value.

The above-described control value for each unit may be provided as a final control value to the chemical dosing output control part 400. In the meantime, according to an alternative embodiment of the present disclosure, when a control period ends before the above-described control value for each unit is calculated, a control value, that is, the control value for each group or the control value for each part, calculated by the time point of the ending of the control period may be used as the control value for each unit, and may be provided as a final control value to the chemical dosing output control part 400. Therefore, according to this embodiment, even when the operation time is insufficient, control values may be stably provided for each part or for each unit.

Figure 6:
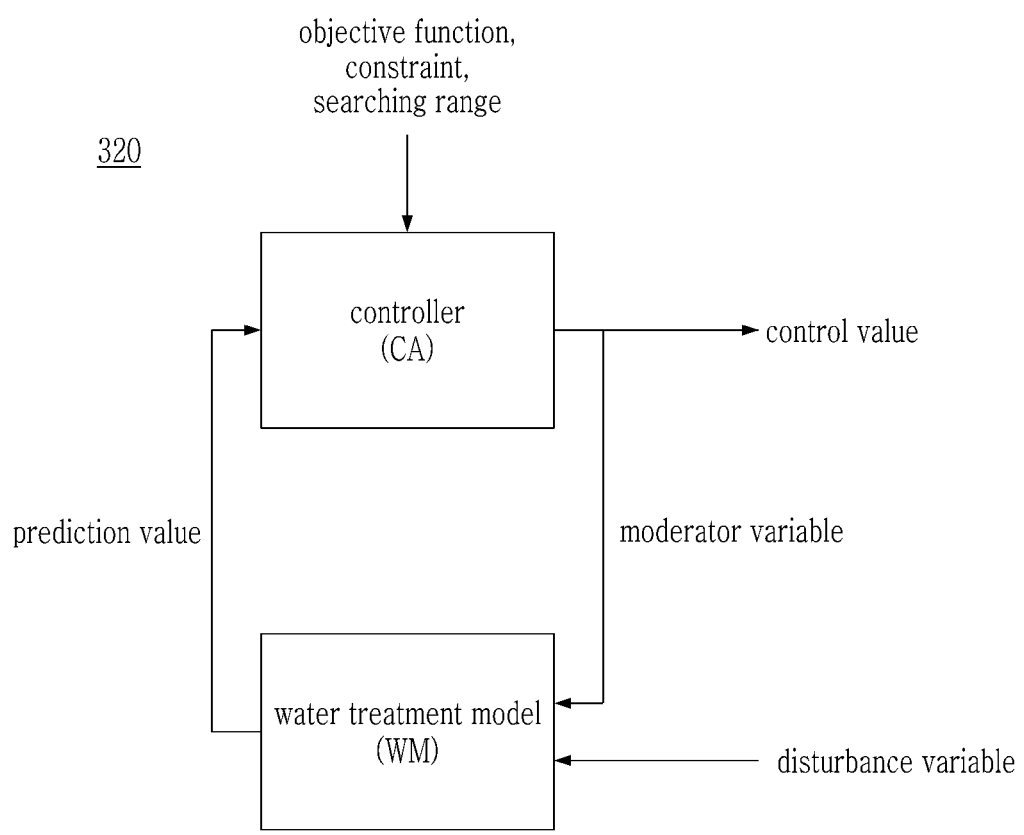
FIG. 6 is a diagram illustrating an interaction between a controller and a water treatment model according to an embodiment of the present disclosure.
Figure 7:
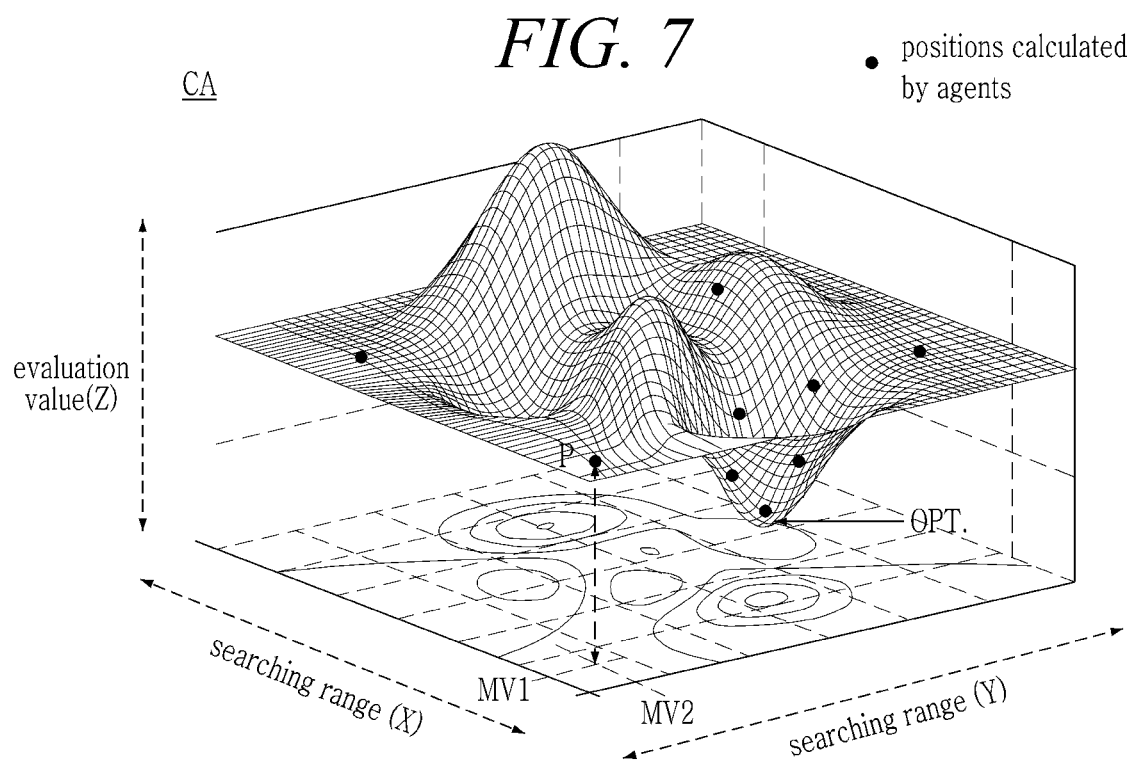
FIG. 7 is a diagram illustrating an optimization algorithm of a controller according to an embodiment of the present disclosure.

Next, an interaction between a controller and a water treatment model for calculating a control value according to an embodiment of the present disclosure will be described. FIG. 6 is a diagram illustrating the interaction between a controller and a water treatment model according to an embodiment of the present disclosure. FIG. 7 is a diagram illustrating an optimization algorithm of a controller according to an embodiment of the present disclosure.

Referring to FIGS. 6 and 7, the control value derivation part 320 executes a water treatment model WM and a controller CA to calculate an optimal control value for chemical dosing optimization. The water treatment model WM may be an algorithm model that receives disturbance variables DVs, such as the state of the feed water flowing into the water treatment plant, the performance of the water treatment plant, etc., and moderator variables MVs, such as the dosages of chemicals (for example, sulfuric acid ($H_2SO_4$), ferric chloride ($FeCl_3$), etc.) dosed into the feed water provided to the water treatment plant. Then the algorithm model of the water treatment model WM calculates the state of the treated water treated in and discharged from the water treatment plant as a prediction value through operation on the received disturbance variables and moderator variables. The controller CA may be an optimization algorithm that calculates chemical dosing costs. The controller CA may have an objective function for minimizing the costs and a constraint for ensuring that the state of the treated water is within a preset range.

When a searching range (X, Y) is set, a plurality of agents of the controller CA may update the positions thereof according to the objective function and the constraint within the set searching range (X, Y). The searching range of the controller CA may be determined first by a setting range and a protection range. The setting range may be a searching range determined according to an input by an operator of the water treatment plant 1. The protection range means a range determined to protect the water treatment plant 1. The setting range and the protection range may be predetermined and may remain the same (i.e., of change) until a new input is made. According to an embodiment, the searching range determined first by the setting range and the protection range, the searching range may be calculated second (i.e., again) by a control value and a correction bias value calculated in a previous control period. Accordingly, according to an embodiment, the control value derivation part 320 may set, as the searching range of the current control period within the first-determined searching range, a range searchable for one control period (for example, one minute) from a position corresponding to the control value of the previous control period or the control value to which the correction bias value of the previous control period is applied.

According to an embodiment, a position calculated within the searching range (X, Y) in which the plurality of agents of the controller CA are set may be converted into chemical dosages that are the moderator variables. The moderator variables may be input to the water treatment model together with the disturbance variables extracted from the real-time data. For example, as shown in FIG. 7, assuming that the current position of any one agent is P, the moderator variables may be MV1 and MV2. Herein, MV1 and MV2 may denote the dosage of a first chemical and the dosage of a second chemical, respectively.

When the disturbance variables and the moderator variables corresponding to each of the plurality of agents are input, the water treatment model WM may perform operation on the disturbance variables and the moderator variables (the chemical dosages corresponding to each of the plurality of agents) and predicts the states of the treated water and calculates a plurality of prediction values respectively corresponding to the positions of the plurality of agents. According to an embodiment, the plurality of prediction values calculated in this way may be input to the controller CA.

Then, according to an embodiment, each of the plurality of agents of the controller CA may evaluate the current position corresponding to its own prediction value (a prediction value corresponding to each of the plurality of agents) according to the constraint and the objective function. All the agents may share the evaluation result. As shown in FIG. 7, when satisfying the constraint, the evaluation result may be expressed as an evaluation value Z that is a valid solution of the objective function.

According to an embodiment, each of the plurality of agents of the controller CA may update its position according to the evaluation result. Since the objective function of the controller CA is for calculating chemical dosing costs and minimizing the costs, the position is updated in the direction in which the evaluation value Z decreases. Each of the plurality of agents may update its current position according to the evaluation result for each of the plurality of agents and the evaluation result for the entire plurality of agents. Each of the plurality of agents memorizes (i.e., store) the evaluation result, that is, the evaluation value Z, at the previous position and shares (i.e., stores) the evaluation results, that is, the evaluation values Zs, of the other agents. Accordingly, as the position updating is iterated, the optimal position OPT, that is, the position at which the evaluation value Z is lowest, may be reached.

According to an embodiment, the above-described position updating may be iterated until a termination condition is satisfied. Herein, according to an embodiment, the termination condition may be a condition in which there is no change in the positions of a predetermined number of agents or more from among the plurality of agents of the controller CA. According to an embodiment, the termination condition may be a condition in which the position updating is iterated a preset number of times. When there is no change in the positions of a predetermined number of agents or more from among the plurality of agents, it may be estimated that the positions are at the optimal position OPT as shown in FIG. 7. When the termination condition is satisfied, the control value derivation part 320 may derive, as a control value, the chemical dosages corresponding to the position at which the largest number of agents among the plurality of agents are gathered, and the control value may be provided to the chemical dosing output control part 400.

Figure 8:
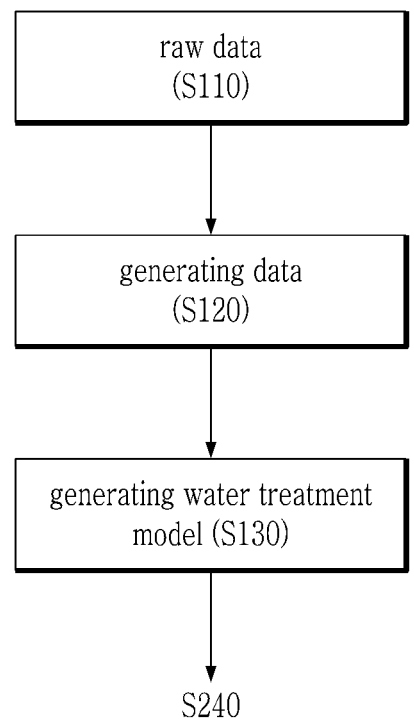
FIG. 8 is a flowchart illustrating a method of generating a water treatment model for chemical dosing optimization for a water treatment plant according to an embodiment of the present disclosure.

Next, a method of generating a water treatment model for chemical dosing optimization for a water treatment plant according to an embodiment of the present disclosure will be described. FIG. 8 is a flowchart illustrating the method of generating a water treatment model for chemical dosing optimization for a water treatment plant according to an embodiment of the present disclosure.

Referring to FIG. 8, a data preprocessing part 200 receives raw data in step S110. Herein, the raw data may include operating data and state data received from by the data preprocessing part 200 from a water treatment plant 1 or a water treatment control device 2 or both. The raw data may result from accumulation and storage the operating data and the state data collected over time from the water treatment plant 1 and the water treatment control device 2. Accordingly, the raw data may include real-time data including the operating data and the state data collected in real time. In particular, the raw data may include a plurality of types of data having different attributes. The raw data is continuously received over time from the water treatment plant 1 or the water treatment control device 2. In particular, the raw data may include input attribute data having input attributes and output attribute data having output attributes. The input attribute data may include the operating data and the state data related to the feed water flowing into the water treatment plant 1, in particular, the DAF device. Examples of the input attribute data may include the flow rate of the feed water, temperature, conductivity, acidity (or hydrogen ion concentration), turbidity, the throughput for the feed water (per unit time), the chemical dosage for the feed water, the chemical dosing concentration, etc. The output attribute data may include the operating data and the state data related to the treated water subjected to water treatment by the DAF device. Examples of the output attribute data may include acidity (or hydrogen ion concentration, pH) or a variation in acidity of the treated water, turbidity or a variation in turbidity, residual iron, etc.

When the raw data is collected, the data preprocessing part 200 preprocesses the raw data to generate training data in step S120. The training data may include data for training and data for verification divided according to use. In addition, the training data includes input data and output data divided according to attribute. The input data may be derived by preprocessing the input attribute data, and the output data may be derived by preprocessing the output attribute data. Examples of the input data may include the flow rate of the feed water, temperature, conductivity, acidity (or hydrogen ion concentration), turbidity, the throughput for the feed water (per unit time), the chemical dosage for the feed water, the chemical dosing concentration, etc. Examples of the output data may include acidity (or hydrogen ion concentration, pH) or a variation in acidity of the treated water, turbidity or a variation in turbidity, residual iron, etc.

Next, a model generation and management unit 20 including an automatic modeling processing part 500, a model generation part 600, and a model selection part 700 receives the training data, and uses the training data to generate a water treatment model in step S130. In step S130, the automatic modeling processing part 500 may design the water treatment model. The designing of the water treatment model means specifying the form of the model, the number of submodels belonging to one model, input, output, and a variable. Then, the model generation part 600 may use the data for training of the training data to perform training on the designed water treatment model, thereby generating a water treatment model that simulates the water treatment plant 1 and predicts the state of the treated water according to the state of the feed water for the water treatment plant 1. Next, the model selection part 700 may use the data for verification of the training data to select, among a plurality of the water treatment models, the water treatment model having the highest similarity to the water treatment plant 1. In this way, the selected water treatment model is provided to a chemical dosing optimization part 300 of an optimization unit 10.

Figure 9:
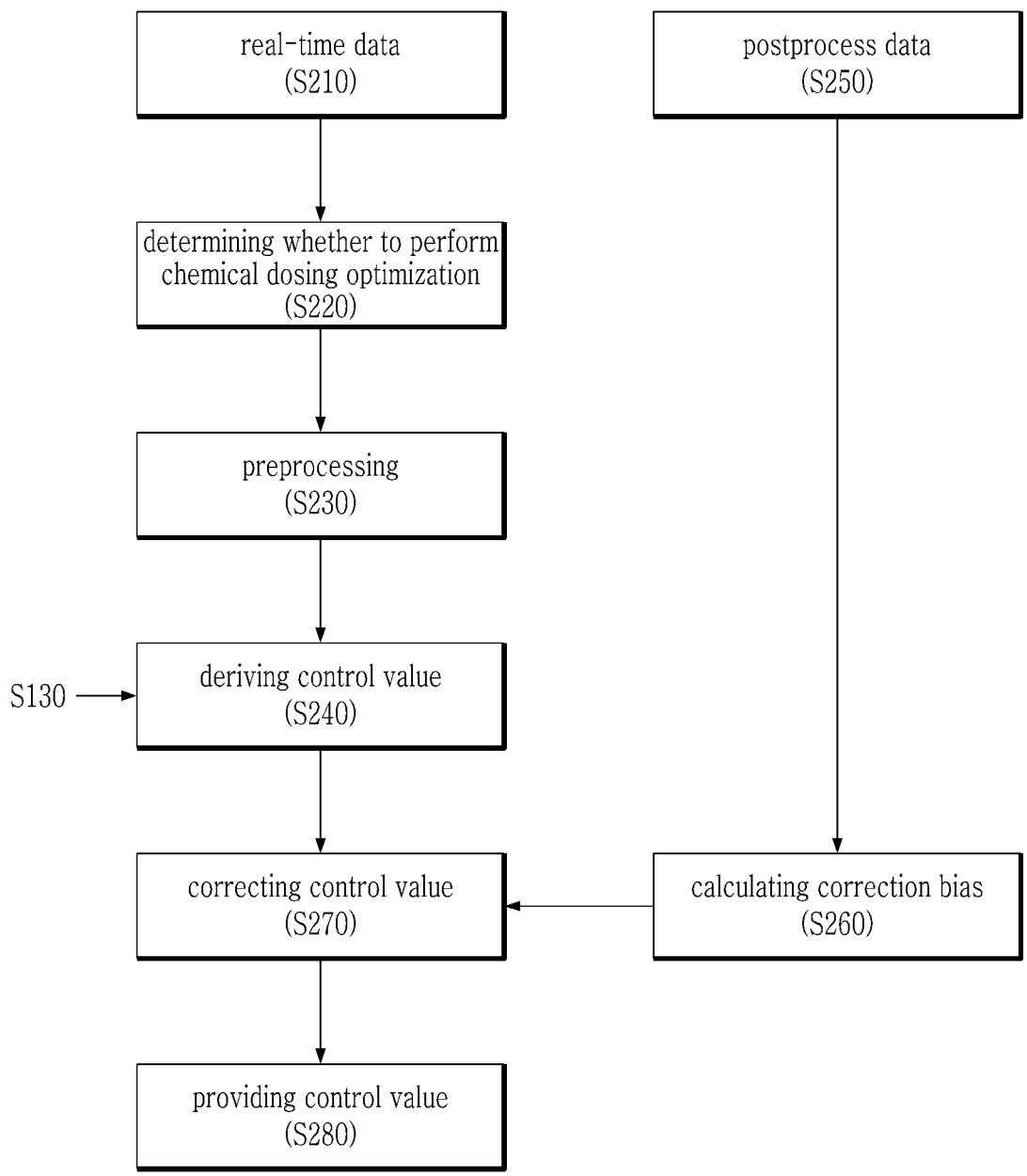
FIG. 9 is a flowchart illustrating a chemical dosing optimization method for a water treatment plant according to an embodiment of the present disclosure.

Next, a chemical dosing optimization method for a water treatment plant according to an embodiment of the present disclosure will be described. FIG. 9 is a flowchart illustrating the chemical dosing optimization method for a water treatment plant according to an embodiment of the present disclosure.

Referring to FIG. 9, a chemical dosing management part 100 may receive real-time data including operating data and state data in step S210. Then, the chemical dosing management part 100 may analyze the real-time data to determine whether a water treatment plant 1 is abnormal, and determines whether to perform chemical dosing optimization for optimizing a chemical dosage in step S220. When the water treatment plant 1 is normal and it is determined to perform chemical dosing optimization, a data preprocessing part 200 may preprocess the real-time data and provides the preprocessed real-time data to an optimization unit 10 including a chemical dosing optimization part 300 and a chemical dosing output control part 400 in step S230.

In the meantime, as described above with reference to FIG. 8, the optimization unit 10 may receive a water treatment model from a model generation and management unit 20. Accordingly, the chemical dosing optimization part 300 of the optimization unit 10 may analyze the real-time data through at least one water treatment model and at least one controller to derive a control value in step S240, wherein the control value is for dosing a minimum of a chemical dosage while the state of the treated water of the water treatment plant is maintained in a normal range. Herein, the controller may be a search algorithm. In addition, examples of the state of the treated water may include turbidity, acidity, residual iron, etc. In step S240, the at least one water treatment model may analyze the real-time data according to an input from the controller and derive a prediction value for predicting the state of the treated water of the water treatment plant, and the at least one controller may search for and derives a control value based on the prediction value of the water treatment model, wherein the control value is for dosing a minimum of a chemical dosage while the state of the treated water is maintained in the normal range. That is, a controller performs a simulation for predicting the state of the treated water of the water treatment plant through a water treatment model simulating the water treatment plant, thereby deriving an optimal control value.

In the meantime, the postprocess protection part 800 may receive postprocess data including the operating data and the state data of the late-stage process of the water treatment plant 1, specifically, the process performed by the automatic strainer (AS), the UF device, and the RO device, in step S250. The postprocess protection part 800 may analyze the received postprocess data to derive a correction bias value, and provides the correction bias value to the chemical dosing output control part 400 in step S260. The correction bias value is for protecting the postprocess according to a postprocess protection logic for preventing damage to the late-stage process, for example, a situation in which fouling occurs.

The chemical dosing output control part 400 may correct the control value according to the correction bias value and a control period and a control range of the water treatment control device 2 in step S270. Next, the chemical dosing output control part 400 may provide the control value derived by the chemical dosing optimization part 300 to the water treatment control device 2 according to a management command or a current state or both of the chemical dosing management part 100 in step S280. Herein, the chemical dosing output control part 400 may not provide the control value to the water treatment control device 2 according to the management command or the current state or both.

Figure 10:
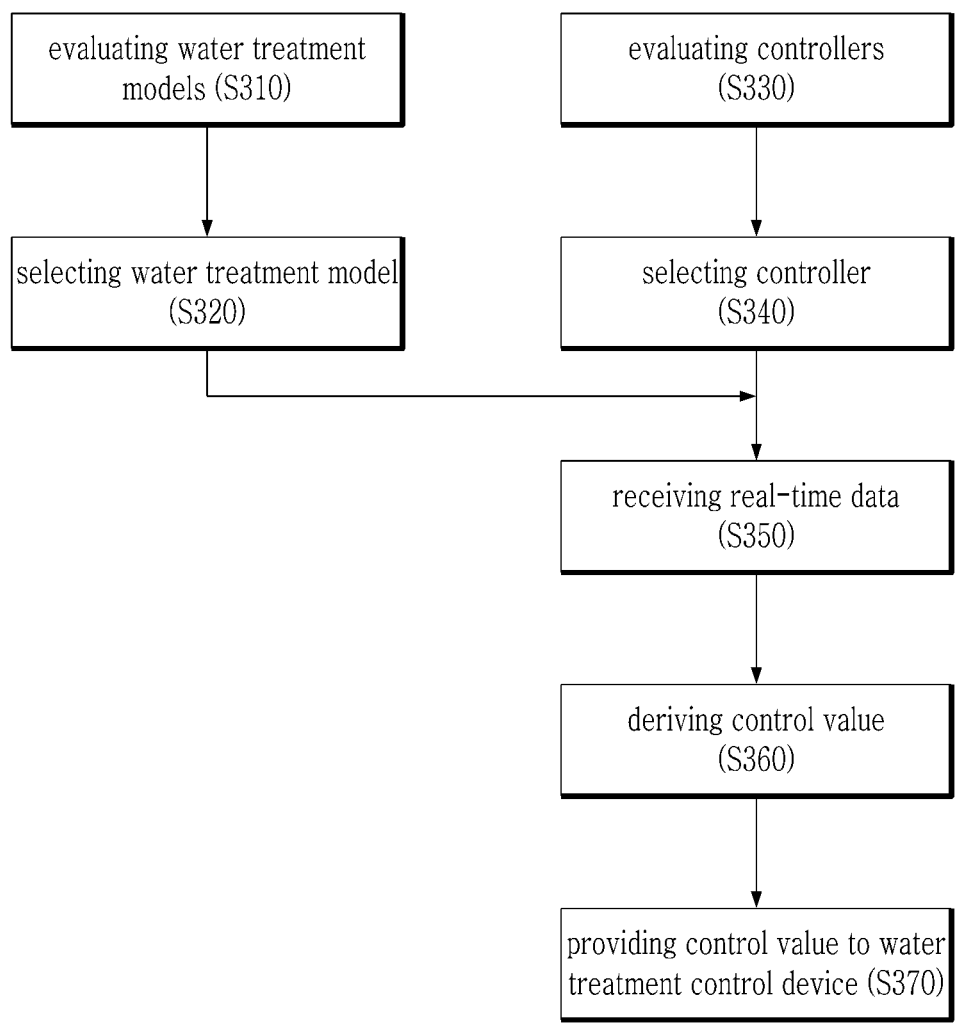
FIG. 10 is a flowchart illustrating a method for controlling chemical dosing optimization for a water treatment plant according to an embodiment of the present disclosure.

Next, a method for controlling chemical dosing optimization for a water treatment plant according to an embodiment of the present disclosure will be described. FIG. 10 is a flowchart illustrating the method for controlling chemical dosing optimization for a water treatment plant according to an embodiment of the present disclosure.

According to an embodiment, the model selection part 700 of a model generation and management unit 20 may use evaluation data to evaluate a plurality of water treatment models in step S310 according to a predetermined period or each time a predetermined event occurs. Then, the model selection part 700 may select an optimal water treatment model having the highest similarity to the water treatment plant at the time point of evaluation according to an evaluation result in step S320. Herein, the model generation and management unit 20 may select a water treatment model for each group, a water treatment model for each part, and a water treatment model for each unit as optimal water treatment models. The selected water treatment model(s) is provided to a chemical dosing optimization part 300.

A controller selection management part 310 may use the evaluation data to evaluate performances of a plurality of controllers through simulation in step S330. In this performance evaluation, the previously selected water treatment model may be used. Next, the controller selection management part 310 may select an optimal controller in step S340 according to an evaluation result. The controller may be an optimization algorithm model, and examples of the controller may include particle swarm optimization (PSO), an autoregressive eXogeneous (ARX) model, the Ziegler-Nichols (ZN) method, etc. Accordingly, the controller selection management part 310 may select, among the plurality of controllers described above, a controller that derives a minimum of a chemical dosage while maintaining the state of the treated water of the water treatment plant 1 in a normal range. The selected controller may be provided to the chemical dosing optimization part 300.

In the meantime, after the water treatment model and the controller are selected, a control value derivation part 320 may receive real-time data in step S350. The real-time data may include operating data and state data received from the water treatment plant 1 or a water treatment control device 2 or both. In particular, the real-time data include the state of the feed water, the state of the treated water, and performance information of the water treatment plant 1. Herein, examples of the state of the feed water may include the flow rate of the feed water, temperature, conductivity, acidity (or hydrogen ion concentration), turbidity, the throughput for the feed water (per unit time), the injection dosing concentration for the feed water, etc. In addition, examples of the state of the treated water may include acidity or a variation in acidity of the treated water, turbidity or a variation in turbidity, etc.

Then, the control value derivation part 320 may analyze the real-time data using the previously selected water treatment model and controller and may calculate a control value in step S360, wherein the control value is for dosing a minimum of a chemical dosage while maintaining the state of the treated water of the water treatment plant 1 in the normal range. According to an embodiment, the control value is calculated for each control period (for example, one minute) of the chemical dosing optimization apparatus 3. In addition, the control value may be sequentially calculated on a per-group basis, a per-part basis, and a per-unit basis.

When the control value is calculated, a chemical dosing output control part 400 may provide the control value derived by the control value derivation part 320 to the water treatment control device 2 in step S370. Herein, according to an embodiment, the chemical dosing output control part 400 may correct the control value according to a correction bias value. In addition, the chemical dosing output control part 400 may convert the control value according to a control period (for example, 10 seconds) of the water treatment control device 2, and may provide the control value resulting from conversion to the water treatment control device 2.

Figure 11:
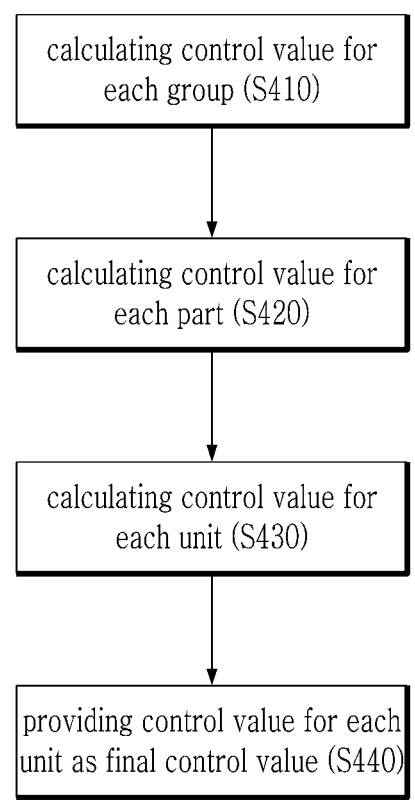
FIG. 11 is a flowchart illustrating a method of calculating a control value for chemical dosing optimization for a water treatment plant according to an embodiment of the present disclosure.

Next, step S360 described above will be described in more detail. FIG. 11 is a flowchart illustrating a method of calculating a control value for chemical dosing optimization for a water treatment plant according to an embodiment of the present disclosure. FIG. 11 is for a detailed description of step S360 of FIG. 10 according to an embodiment.

In FIG. 11, it is assumed that the control value derivation part 320 has received the water treatment model for each group, the water treatment model for each part, and the water treatment model for each unit selected by the model selection part 700 of the model generation and management unit 20. In addition, it is assumed that the control value derivation part 320 has received the controller for each group, the controller for each part, and the controller for each unit selected respectively corresponding to the water treatment model for each group, the water treatment model for each part, and the water treatment model for each unit from the controller selection management part 310.

A group control value derivation part 321 may classify a plurality of control targets into a plurality of groups, and analyze group data of the real-time data using the water treatment model for each group and the controller for each group, thereby group control value derivation part 321 may calculate a control value for each group in step S410. Herein, the group data is data derived from the real-time data corresponding to the control targets belonging to each group.

Next, a part control value derivation part 322 may divide each of the plurality of groups into a plurality of parts, and analyze part data of the real-time data with the control value for each group as an initial value using the water treatment model for each part and the controller for each part, thereby part control value derivation part 322 may calculate a control value for each part in step S420. Herein, the part data is data derived from the real-time data corresponding to the control targets belonging to each part.

Next, a unit control value derivation part 323 may divide each of the plurality of parts into a plurality of units, and analyze unit data of the real-time data with the control value for each part as an initial value through the water treatment model for each unit and the controller for each unit, thereby the unit control value derivation part 323 may calculate a control value for each unit in step S430. Herein, the unit data is data derived from the real-time data corresponding to the control target belonging to each unit.

Next, the unit control value derivation part 323 may provide the control value for each unit as a final control value to the chemical dosing output control part 400 in step S440.

As a specific example of steps S410 to S430 described above, it is assumed that the plurality of control targets are chemical dosages corresponding to each of the plurality of water tanks of a dissolved air flotation (DAF) device. Herein, it is assumed that there are 100 water tanks. For example, when there are 100 water tanks, 25 water tanks may be classified as one group, 25 water tanks belonging to each group may be divided into five parts each including five water tanks, and five water tanks belonging to each part may be divided into five units each including one water tank. In addition, the real-time data may include the following: the state (for example, turbidity, and acidity) of the feed water flowing into each of the 100 water tanks; and the state (for example, turbidity, and acidity) of the treated water discharged from each of the 100 water tanks after being processed according to dissolved air flotation in each of the 100 water tanks. In this case, the group data of a group may include average values, median values, lowest values, highest values, etc. of the states (for example, turbidity, and acidity) of the feed water and the treated water of 25 water tanks belonging to the particular group. In addition, the part data of a part may include average values, median values, lowest values, highest values, etc. of the states (for example, turbidity, and acidity) of the feed water and the treated water of five water tanks belonging to the particular part. In turn, the unit data may include values of the states (for example, turbidity, and acidity) of the feed water and the treated water of a water tank belonging to the particular unit.

According to steps S410 to S430 described above, the control value for each group is calculated, the control value for each group is used as an initial value to calculate the control value for each part, and the control value for each part is used as an initial value to calculate the control value for each unit. Accordingly, it is possible to significantly reduce operation time, compared to calculating simultaneously the control value for each unit that is a sought final control value.

In the meantime, according to an alternative embodiment of the present disclosure, when a control period ends before the control value for each unit is calculated while steps S410 to S430 described above are still being performed, the unit control value derivation part 323 may use a control value, that is, the control value for each group or the control value for each part, calculated by the time point of the ending of the control period as the control value for each unit, and may provide the control value for each group or the control value for each part as a final control value to the chemical dosing output control part 400. Therefore, according to this embodiment, even when the operation time is insufficient, control values may be stably provided for each part or for each unit.

Figure 12:
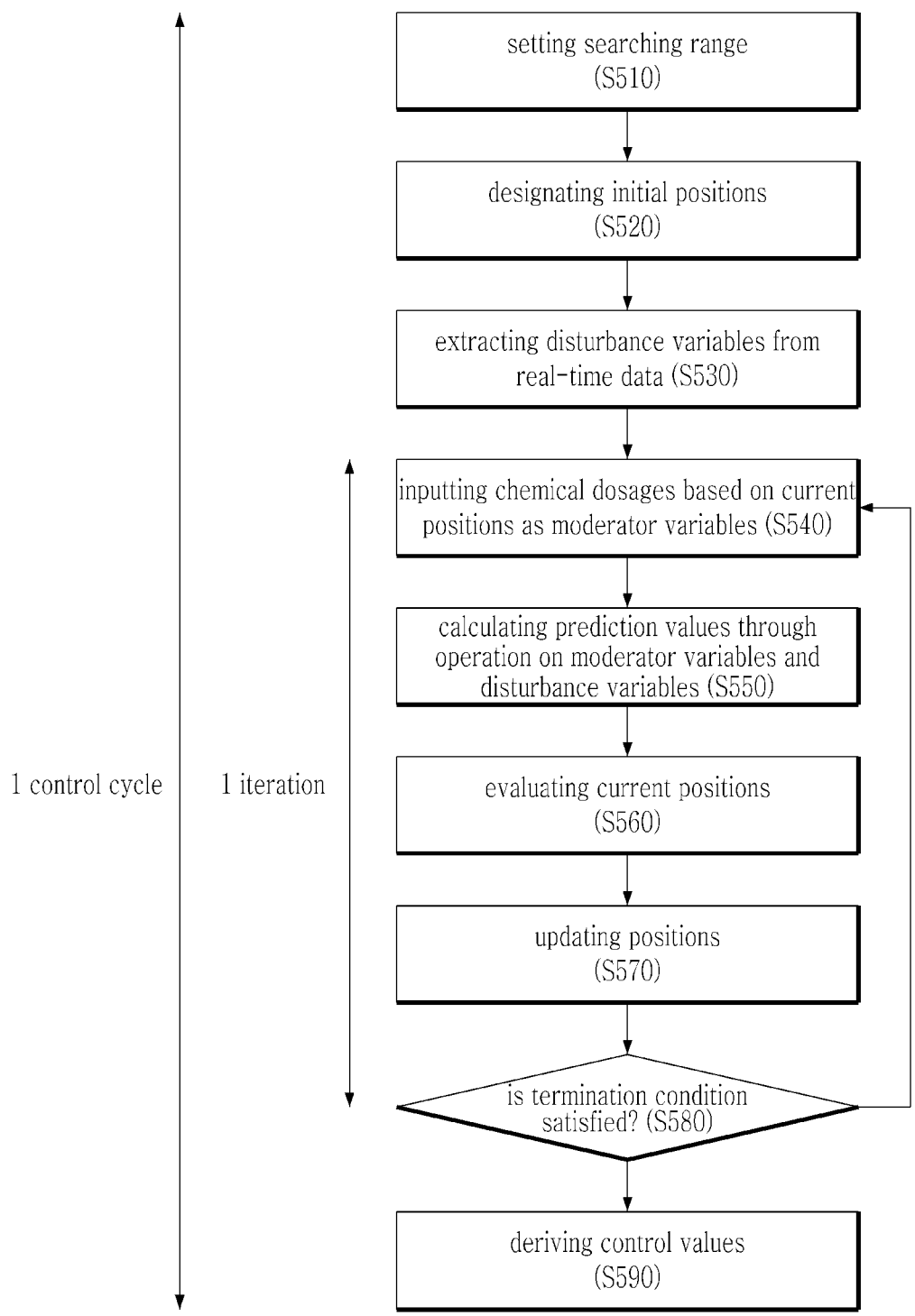
FIG. 12 is a flowchart illustrating a method for calculating an optimal control value for chemical dosing optimization according to an embodiment of the present disclosure.

Next, a method for calculating an optimal control value for chemical dosing optimization according to an embodiment of the present disclosure will be described. FIG. 12 is a flowchart illustrating the method for calculating an optimal control value for chemical dosing optimization according to an embodiment of the present disclosure.

In FIG. 12, according to an embodiment, a water treatment model WM is an algorithm model that receives disturbance variables, such as the state of the feed water flowing into the water treatment plant, the performance of the water treatment plant, etc., and moderator variables, such as the dosages of chemicals dosed into the feed water provided to the water treatment plant. Then, the water treatment model WM calculates the state of the treated water treated in and discharged from the water treatment plant as a prediction value through operation on the received disturbance variables and moderator variables. The controller CA is an optimization algorithm that calculates chemical dosing costs. The controller CA has an objective function for minimizing costs and a constraint for ensuring that the state of the treated water is within a preset range.

Referring to FIGS. 6, 7, and 12, according to an embodiment, a control value derivation part 320 sets a searching range of the controller CA in step S510. The searching range of the controller CA is determined first by a setting range and a protection range. The setting range is a searching range determined according to an input by an operator of the water treatment plant 1. The protection range means a range determined to protect the water treatment plant 1. The setting range and the protection range may be predetermined and remain unchanged until a new input is made. Within the searching range determined first by the setting range and the protection range, the searching range may be calculated second (i.e., is calculated again) by a control value and a correction bias value calculated in a previous control period. Accordingly, the control value derivation part 320 may set, as the searching range of the current control period within the first-determined searching range, a range searchable for one control period (for example, one minute) from a position corresponding to the control value of the previous control period or from a position corresponding to the control value to which the correction bias value of the previous control period is applied.

When the searching range is determined, the control value derivation part 320 may designate initial positions of a plurality of agents of the controller CA within the set searching range in step S520. Next, the control value derivation part 320 man extract disturbance variables from real-time data in step S530.

When the current position of each of the plurality of agents of the controller CA within the searching range is output, the control value derivation part 320 may convert the current position of each of the plurality of agents into the moderator variables, and may input the moderator variables resulting from conversion to the water treatment model WM together with the disturbance variables in step S540. For example, as shown in FIG. 7, assuming that the current position of any one agent is P, the moderator variables are MV1 and MV2. Herein, MV1 and MV2 may denote the dosage of a first chemical and the dosage of a second chemical, respectively.

Next, in step S550, the water treatment model WM may predict the states of the treated water through operation on each of the plurality of chemical dosages corresponding to the position of each of the plurality of agents. Then, the water treatment model WM may calculate a plurality of prediction values respectively corresponding to the positions of the plurality of agents in step S550. The plurality of prediction values calculated may be input to the controller CA.

Then, in step S560, each of the plurality of agents of the controller CA may evaluate the current position corresponding to its own prediction value (a prediction value corresponding to each of the plurality of agents) according to the constraint and the objective function. All the agents may share an evaluation result. As shown in FIG. 7, when satisfying the constraint, the evaluation result may be expressed as an evaluation value Z that is a valid solution of the objective function.

Next, in step S570, each of the plurality of agents of the controller CA may update its position according to the evaluation result. The objective function of the controller CA is for calculating chemical dosing costs and minimizing the costs, so the position is updated in the direction in which the evaluation value Z decreases. Each of the plurality of agents updates its current position according to the evaluation result for each of the plurality of agents and the evaluation result for the entire plurality of agents. Each of the plurality of agents may memorize and store the evaluation result, that is, the evaluation value Z, at the previous position and may share and store the evaluation results, that is, the evaluation values Zs, of the other agents. Accordingly, as steps S540 to S570 described above are iterated (i.e., repeated performed) and the position updating is iterated, the optimal position OPT (in FIG. 7), that is, the position at which the evaluation value Z is lowest, may be reached.

Next, the control value derivation part 320 may determine whether a termination condition is satisfied in step S580. Herein, according to an embodiment, the termination condition may be a condition in which there is no change in the positions of a predetermined number of agents or more among the plurality of agents of the controller CA. According to another embodiment, the termination condition may be a condition in which the position updating is iterated a preset number of times. When there is no change in the positions of a predetermined number of agents or more among the plurality of agents, it may be determined that the positions are at the optimal position OPT (in FIG. 7).

As a determination result in step S580, when the termination condition is not satisfied, steps S540 to S570 described above may be repeated. Conversely, as a determination result in step S580, when the termination condition is satisfied, the control value derivation part 320 may derive, as a control value, the chemical dosages corresponding to the position at which the largest number of agents among the plurality of agents are gathered, in step S590.

Figure 13:
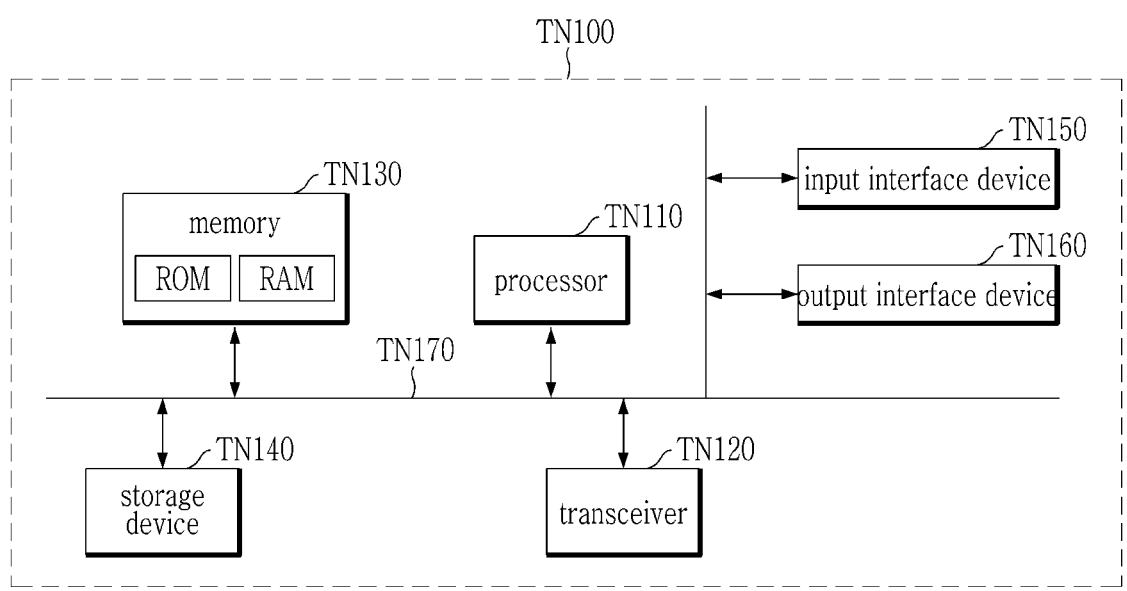
FIG. 13 is a diagram illustrating a computing device according to an embodiment of the present disclosure.

FIG. 13 is a diagram illustrating a computing device according to an embodiment of the present disclosure. A computing device TN100 may be the device or apparatus (for example, the water treatment control device 2 and the chemical dosing optimization apparatus 3) described in the present specification.

In the embodiment of FIG. 13, the computing device TN100 may include at least one processor TN110, a transceiver TN120, and a memory TN130. Furthermore, the computing device TN100 may include a storage device TN140, an input interface device TN150, and an output interface device TN160. The elements included in the computing device TN100 may be connected to each other via a bus TN170 to communicate with each other.

The processor TN110 may execute program commands stored in either the memory TN130 or the storage device TN140 or both. The processor TN110 may mean a central processing unit (CPU), a graphics processing unit (GPU), or a dedicated processor for performing the methods according to the embodiments of the present disclosure. The processor TN110 may be configured to realize the described procedures, functions, and methods related to the embodiments of the present disclosure. The processor TN110 may control each element of the computing device TN100.

Each of the memory TN130 and the storage device TN140 may store therein various types of information related to the operation of the processor TN110. Each of the memory TN130 and the storage device TN140 may be provided as either a volatile storage medium or a non-volatile storage medium or both. For example, the memory TN130 may be either a read only memory (ROM) or a random access memory (RAM) or both.

The transceiver TN120 may transmit or receive wired signals or wireless signals. The transceiver TN120 may be connected to a network to perform communication.

In the meantime, the various methods according to the above-described embodiments of the present disclosure may be implemented in the form of programs readable through various computer means and recorded on a computer-readable recording medium. Herein, the recording medium may include program commands, data files, data structures, and the like separately or in combinations. The program commands to be recorded on the recording medium may be specially designed and configured for embodiments of the present disclosure or may be well-known to and be usable by those skilled in the art of computer software. Examples of the recording medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instructions include not only a mechanical language formatted by a compiler but also a high level language that may be implemented by a computer using an interpreter, and the like. The hardware devices may be configured to be operated by one or more software modules or vice versa to conduct the operation according to the present disclosure.

Although the embodiments of the present disclosure have been described, those skilled in the art will appreciate that addition, change, or deletion of elements may modify and change the present disclosure in various ways without departing from the spirit and scope of the present disclosure disclosed in the claims, and such modifications and changes also fall within the scope of the present disclosure. Also, it is noted that any one feature of an embodiment of the present disclosure described in the specification may be applied to another embodiment of the present disclosure.

The invention claimed is:

1. An apparatus for controlling chemical dosing optimization in a water treatment plant treating feed water, the apparatus comprising:
a control value derivation part configured to receive real-time data, analyze the real-time data through a water treatment model and a controller in response to receiving the real-time data, and calculate a control value for dosing a minimum of a chemical dosage into the feed water while maintaining a state of treated water of the water treatment plant in a range, the water treatment model simulating the water treatment plant and the controller being an optimization algorithm;
a chemical dosing output control part configured to provide the control value to a water treatment control device; and
the water treatment control device that controls injection of the minimum of the chemical dosage to the water treatment plant based on the control value, the control value being an input control parameter which is input into the water treatment control device,
wherein a state of the feed water and the state of the treated water include at least one value of acidity indicated by pH, turbidity, residual iron, dissolved oxygen, nitrogen, mercury, phosphorus, carbon dioxide, or hydrogen ion concentration of the treated water, and the normal range is a predetermined value range of acidity indicated by pH, turbidity, residual iron, dissolved oxygen, nitrogen, mercury, phosphorus, carbon dioxide, or hydrogen ion concentration,
wherein the control value derivation part comprises:
a group control value derivation part configured to classify a plurality of control targets into a plurality of groups, and analyze group data of the real-time data through a for-group water treatment model for each group and the controller for each group, thereby, to calculate a for-group control value for each group;
a part control value derivation part configured to divide each of the plurality of groups into a plurality of parts, and analyze part data of the real-time data with the for-group control value for each group as an initial value through a for-part water treatment model for each part and the controller for each part, thereby, to calculate a for-part control value for each part; and
a unit control value derivation part configured to divide each of the plurality of parts into a plurality of units, and analyze unit data of the real-time data with the for-part control value for each part as an initial value through a for-unit water treatment model for each unit and the controller for each unit, thereby, to calculate a for-unit control value for each unit.

2. The apparatus of claim 1, wherein the water treatment model is configured to analyze the real-time data to calculate a prediction value for predicting the state of the treated water according to the state of the feed water for the water treatment plant, the treated water being discharged after the water treatment plant performs water treatment of the feed water, and
the controller is configured to refer to the prediction value to calculate the control value for dosing the minimum of the chemical dosage while maintaining the state of the treated water of the water treatment plant in the range.

3. The apparatus of claim 1, wherein the control value derivation part is configured to calculate, for each preset control period, the control value.

4. The apparatus of claim 1, wherein the unit control value derivation part is configured to, in response to ending of a control period before the for-unit control values for all of the units are calculated, use the for-group control value for each group or the for-part control value for each part calculated by a time point of the ending of the control period as the for-unit control value for each unit, and provide the for-unit control value for each unit substituting as a final for-unit control value to the chemical dosing output control part.

5. The apparatus of claim 1, wherein the group data is data derived from real-time data corresponding to a group of control targets, from among the plurality of control targets, belonging to each group,
the part data is data derived from the real-time data corresponding to a part of the control targets, from among the plurality of control targets, belonging to each part, and
the unit data is data derived from the real-time data corresponding to a control target, from among the plurality of control targets, belonging to each unit.

6. The apparatus of claim 1,
wherein the controller comprises a plurality of controller units, and the apparatus further comprising
a controller selection management part configured to evaluate respective performances of the plurality of the controller units through simulation for the plurality of the controller units, and select any one of the plurality of the controller units according to the evaluation.

7. The apparatus of claim 1,
wherein the water treatment model comprises a plurality of water treatment model units,
the apparatus further comprising
a model generation and management unit configured to select one water treatment model among the plurality of the water treatment model units based on a similarity to the water treatment plant, and provide the selected one water treatment model to the control value derivation part, each of the plurality of the water treatment model units simulating the water treatment plant and predicting the state of the treated water discharged after the water treatment plant performs water treatment of feed water for the water treatment plant, according to the state of the feed water.

8. An apparatus for controlling chemical dosing optimization in a water treatment plant treating feed water, the apparatus comprising:
a controller selection management part configured to evaluate respective performances of a plurality of controllers through simulation for the plurality of controllers, and select the controller according to the evaluated performances;
a control value derivation part configured to receive real-time data, analyze the real-time data through a water treatment model and the controller in response to receiving the real-time data, and calculate a control value for dosing a minimum of a chemical dosage into the feed water while maintaining a state of treated water of the water treatment plant in a range, the water treatment plant simulating the water treatment model and the controller being an optimization algorithm; and
a water treatment control device that controls injection of the minimum of the chemical dosage to the water treatment plant based on the control value, the control value being an input control parameter which is input into the water treatment control device,
wherein a state of the feed water and the state of the treated water include at least one value of acidity indicated by pH, turbidity, residual iron, dissolved oxygen, nitrogen, mercury, phosphorus, carbon dioxide, or hydrogen ion concentration of the treated water, and the range is a predetermined value range of acidity indicated by pH, turbidity, residual iron, dissolved oxygen, nitrogen, mercury, phosphorus, carbon dioxide, or hydrogen ion concentration,
wherein the control value derivation part comprises:
a group control value derivation part configured to classify a plurality of control targets into a plurality of groups, and analyze group data of the real-time data through a for-group water treatment model for each group and the controller for each group, thereby, to calculate a for-group control value for each group;
a part control value derivation part configured to divide each of the plurality of groups into a plurality of parts, and analyze part data of the real-time data with the for-group control value for each group as an initial value through a for-part water treatment model for each part and the controller for each part, thereby, to calculate a for-part control value for each part; and
a unit control value derivation part configured to divide each of the plurality of parts into a plurality of units, and analyze unit data of the real-time data with the for-part control value for each part as an initial value through a for-unit water treatment model for each unit and the controller for each unit, thereby, to calculate a for-unit control value for each unit.

9. The apparatus of claim 8, wherein the water treatment model is configured to analyze the real-time data to calculate a prediction value for predicting the state of the treated water according to the state of the feed water for the water treatment plant, the treated water being discharged after the water treatment plant performs water treatment of the feed water, and
the controller is configured to refer to the prediction value to calculate the control value such that the control value is to set the minimum of the chemical dosage while maintaining the state of the treated water of the water treatment plant in the normal range.

10. The apparatus of claim 8, wherein the unit control value derivation part is configured to, in response to ending of a control period before the for-unit control values for all of the units are calculated, use the for-group control value for each group or the for-part control value for each part calculated by a time point of the ending of the control period as the for-unit control value for each unit, and provide the for-unit control value for each unit substituting as a final for-unit control value to a chemical dosing output control part.

11. The apparatus of claim 8, wherein the group data is data
derived from the real-time data corresponding to a group of control targets, from among the plurality of control targets, belonging to each group,
the part data is data derived from the real-time data corresponding to a part of the control targets, from among the plurality of control targets, belonging to each part, and the unit data is data derived from the real-time data corresponding to a control target, from among the plurality of control targets, belonging to each unit.

12. The apparatus of claim 8,
wherein the water treatment model comprises a plurality of water treatment model units,
the apparatus further comprising
a model generation and management unit configured to select one water treatment model among the plurality of the water treatment model units based on a similarity to the water treatment plant, and provide the selected one water treatment model to the control value derivation part, each of the plurality of the water treatment model units simulating the water treatment plant and predicting the state of the treated water discharged after the water treatment plant performs water treatment of feed water for the water treatment plant, according to the state of the feed water.

13. A method for controlling chemical dosing optimization in a water treatment plant treating feed water, the method comprising:
receiving real-time data by a control value derivation part;
analyzing, by the control value derivation part, the real-time data through a water treatment model and a controller, and calculating a control value for dosing a minimum of a chemical dosage into the feed water while maintaining a state of treated water of the water treatment plant in a range, the water treatment model simulating the water treatment plant and the controller being an optimization algorithm; and providing the control value to a water treatment control device by a chemical dosing output control part; and controlling, by the water treatment control device, the injection of the minimum of the chemical dosage to the water treatment plant based on the control value, the control value being an input control parameter which is input into the water treatment control device, wherein a state of the feed water and the state of the treated water include at least one value of acidity indicated by pH, turbidity, residual iron, dissolved oxygen, nitrogen, mercury, phosphorus, carbon dioxide, or hydrogen ion concentration of the treated water, and the range is a predetermined value range of acidity indicated by pH, turbidity, residual iron, dissolved oxygen, nitrogen, mercury, phosphorus, carbon dioxide, or hydrogen ion concentration, wherein the calculating of the control value comprises:

classifying, by a group control value derivation part, a plurality of control targets into a plurality of groups, and analyzing group data of the real-time data through a for-group water treatment model for each group and the controller for each group, thereby, to calculate a for-group control value for each group;

dividing, by a part control value derivation part, each of the plurality of groups into a plurality of parts, and analyzing part data of the real-time data with the for-group control value for each group as an initial value through a for-part water treatment model for each part and the controller for each part, thereby, to calculate a for-part control value for each part; and dividing, by a unit control value derivation part, each of the plurality of parts into a plurality of units, and analyzing unit data of the real-time data with the for-part control value for each part as an initial value through a for-unit water treatment model for each unit and the controller for each unit, thereby, to calculate a for-unit control value for each unit.

14. The method of claim 13, wherein in the calculating of the control value, the water treatment model analyzes the real-time data and calculates a prediction value for predicting the state of the treated water according to the state of the feed water for the water treatment plant, the treated water being discharged after the water treatment plant performs water treatment of the feed water, and the controller calculates the control value for dosing the minimum of the chemical dosage while the state of the treated water of the water treatment plant is maintained in the range.

15. The method of claim 13, wherein in the calculating of the control value, the control value derivation part calculates, for each preset control period, the control value.

16. The method of claim 13, wherein in the calculating of the control value, in response to ending of a control period before the for-unit control values for all of the units are calculated, the for-group control value for each group or the for-part control value for each part calculated by a time point of the ending of the control period is used as the for-unit control value for each unit, and the for-unit control value for each unit is provided for substitution as a final for-unit control value to the chemical dosing output control part.

17. The method of claim 13, wherein the group data is data derived from the real-time data corresponding to a group of control targets, from among the plurality of control targets, belonging to each group, the part data is data derived from the real-time data corresponding to a part of the control targets, from among the plurality of control targets, belonging to each part, and the unit data is data derived from the real-time data corresponding to a control target, from among the plurality of control targets, belonging to each unit.

* * * * *